United States Patent
Pare et al.

(10) Patent No.: US 9,638,025 B2
(45) Date of Patent: May 2, 2017

(54) MUD PULSER WITH POPPET VALVE, HAVING LINEAR DISPLACEMENT DETERMINATION MEANS

(71) Applicant: HPC ENERGY SERVICES LTD., Calgary (CA)

(72) Inventors: Quentin Pare, Calgary (CA); Carl Brown, Calgary (CA); Thomas Auer, Calgary (CA); Ben Thomas, Calgary (CA)

(73) Assignee: HPC ENERGY TECHNOLOGIES LTD., Calgary, Alberta ( * ) Notice: Subject to any disclaimer, the term of this patent is extended or adjusted under 35 U.S.C. 154(b) by 46 days.

(21) Appl. No.: 14/600,792

(22) Filed: Jan. 20, 2015

(65) Prior Publication Data
US 2016/0208953 A1 Jul. 21, 2016

(51) Int. Cl.
*E21B 47/12* (2012.01)
*E21B 47/18* (2012.01)
*F16K 37/00* (2006.01)
*G01D 5/20* (2006.01)

(52) U.S. Cl.
CPC ............ *E21B 47/12* (2013.01); *E21B 47/18* (2013.01); *F16K 37/00* (2013.01); *G01D 5/2013* (2013.01)

(58) Field of Classification Search
CPC ..................................... E21B 47/12
USPC ............... 137/554; 251/129.04, 129.11
See application file for complete search history.

(56) References Cited

U.S. PATENT DOCUMENTS

| | | | | |
|---|---|---|---|---|
| 5,722,460 | A | * 3/1998 | Olsen | F15B 13/0402 137/625.65 |
| 6,460,567 | B1 | * 10/2002 | Hansen, III | F16K 31/04 137/554 |
| 6,805,079 | B1 | * 10/2004 | Brehob | F01L 9/04 123/90.11 |
| 7,564,741 | B2 | 7/2009 | Pratt et al. | |
| 8,342,478 | B1 | * 1/2013 | Cordray | F16K 37/0075 137/554 |
| 2001/0035213 | A1 | * 11/2001 | Yoneda | F01L 1/46 137/554 |
| 2009/0194721 | A1 | * 8/2009 | Watanabe | F16K 31/04 251/129.04 |
| 2010/0182138 | A1 | * 7/2010 | Schofield | B60R 25/1004 340/426.24 |
| 2014/0262525 | A1 | | 9/2014 | Fuller et al. |

FOREIGN PATENT DOCUMENTS

CN 201460866 U 5/2010

* cited by examiner

*Primary Examiner* — Michael R Reid
*Assistant Examiner* — Paul J Gray
(74) *Attorney, Agent, or Firm* — Gowling WLG (Canada) LLP; D. Doak Home

(57) ABSTRACT

A measurement-while-drilling servo-actuator for use in mud-pulse telemetry, which determines linear position of a poppet valve therein without counting revolutions of a stepper motor which positions said poppet valve. A sensor senses a magnetic field intensity value, or an inductance value, which is proportional to the position of the poppet valve relative to the sensor. A look-up table of reference outputs corresponding to known position of the poppet valve is used to determine the position of the poppet valve. A method of determining a position of a poppet valve in a mud pulser is further disclosed.

15 Claims, 9 Drawing Sheets

MUD PULSER WITH POPPET VALVE, HAVING LINEAR DISPLACEMENT DETERMINATION MEANS

TECHNICAL FIELD

The present disclosure is directed to a pulser actuator for use in mud pulse telemetry, namely for use in so-called "measurement-while-drilling ("MWD") operations. More particularly the invention relates to a novel pulser actuator having linear displacement detection/determination means to determine actual linear position of a poppet valve within said pulser actuator.

BACKGROUND OF THE INVENTION, AND DESCRIPTION OF THE PRIOR ART

In oil and gas drilling data collected downhole from various sensors with respect to direction and orientation of the bit and/or geological formations encountered during drilling is transmitted uphole in various manners for use by the drilling operator at surface to control drilling.

Engaging in this practice is referred to as performing "Measurement-While-Drilling" (MWD). Logging data may also be transmitted uphole, in which case engaging in this practice is referred to as "Logging-While-Drilling" (LWD). Various types of telemetry technology exist to permit transmission of data collected downhole to the surface.

One type of commercialized telemetry technology is mud pulse telemetry. In mud pulse telemetry, pressure pulses are created downhole by periodically constricting the flow of the drilling mud through a drill string by means of a pulser actuator. Such pressure pulses then travel back through the drilling mud and/or the formation itself, where at surface such pressure pulses are received and decoded to reveal valuable information about drilling conditions downhole. When a main valve controlled by the pulser actuator is completely closed, mud flow through the valve is prevented and pressure in the drilling mud increases; when the main valve is subsequently opened, pressure in the drilling mud decreases. Pressure pulses can consequently be generated in the drilling mud by repeatedly opening and closing the main valve. One type of main valve used in pulsers is a poppet and orifice type valve, in which a poppet linearly reciprocates above a valve seat. When the poppet is pressed against the valve seat, the orifice and consequently the main valve are closed; the orifice and main valve are otherwise considered fractionally or entirely open. The pulser is typically housed within a tubular and attached to the bottom hole assembly (BHA) of a drill string when in use.

In some mud pulse telemetry units, a servo-valve having a pilot or poppet-type valve is used to actuate a main valve that is responsible for generating the sizable pressure pulses sent to the surface. The pilot/servo-valve is linearly oscillated by an electric motor, which poppet valve thereof is accordingly controlled to open and close at precise times and durations to thereby control pressure applied for similar times and durations to a main valve by drilling mud. By regulating the pressure on the main valve, the pilot valve can cause the main valve to open and close, at precise times and for varied duration, thereby generating the pressure pulses to specific intensity, duration, and sequence. In such manner data can be transmitted uphole and received at surface by sensors which receive such pressure pulses and decode such pressure pulses into useful information regarding conditions downhole during drilling.

It can be very useful to know, for a controller which controls the servo valve motor and thus the movement of the poppet valve to create pressure waves of various duration and intensity, the precise position of the pilot (servo) valve relative to the valve seat, namely whether the pilot valve (poppet) is in a fully open, fully closed, or some intermediate position therebetween. However, frequently LCM (i.e. lost circulation material, such as fine drill cuttings) sometimes enters the mud pulser unit and may impede or restrict to varying degrees the linear oscillation of the poppet, which may require the controller to initiate a "clearing" cycle to initiate a "back and forth" motion to the poppet valve to attempt to clear an LCM obstruction which otherwise prevents full open or full close positioning of the poppet. Knowledge of precise positioning of the poppet may then become unknown to the controller.

One way knowledge of the precise position of the poppet can be regained is by driving the poppet into or away from the valve seat until the poppet is physically restrained from further movement, typically by abutting a mechanical "stop" which limits further travel. When the poppet is so restrained the controller can detect that the motor draws increased current due to meeting the increased resistance of the "stop", and can thereby determine the poppet has reached the limit of its travel in that direction, and thereafter cease driving the poppet in that direction. Driving the poppet in this manner is referred to as "overdriving" the poppet.

However, it is usually very undesirable to rely on repeatedly overdriving the poppet, after for example a cleaning cycle, to determine its position relative to the fully open or fully closed position because the current spikes that overdriving produces can relatively quickly drain the batteries that power the motor. Maintaining battery life of a downhole mud pulser is an extremely important consideration in increasing the downhole time of such pulser actuator. Otherwise, if batteries which power the pulser-actuator are "drained" more frequently, such causes a drilling operator to have to more frequently "trip out" a drill string to replace the mud pulser and/or batteries therein, which results in greatly-increased drilling expense, not to mention lost time in drilling, which adds further expense considering drilling rigs are generally rented to drilling companies on a per diem basis and lost time therefore results in increased equipment rental costs, to say nothing of the delay and lost profits caused in prolonging the time before revenue can be received from a well.

One example of a mud pulser/pulser actuator having a pilot valve used to actuate a main valve is given in U.S. Pat. No. 7,564,741 to Pratt et al. In Pratt et al., the pilot valve comprises a poppet and a valve seat, and a stepper motor is used to linearly move the poppet relative to the valve seat. A controller is connected to and controls the stepper motor. A plurality of Hall sensors (typically three for a three-pole stepper motor) are needed, which Hall-effect sensors are mounted on the stator of the stepper motor-output from such Hall-effect sensors allows the controller to "count" the number of rotations the motor's rotor undergoes. Counting the number of rotations of the motor, which moves the poppet through known reduction gearing, allows the controller to determine the linear position of the poppet relative to the valve seat. For example, the controller may first zero the poppet by forcing it against the valve seat, following which the motor can open the pilot valve by lifting the poppet a certain linear distance away from the valve seat (i.e. by the controller directing the motor to rotate a number of revolutions). This linear distance may be encoded in the controller as being a function of the number of rotations of the motor's rotor, as determined from measurements obtained using the Hall sensors on the motor, instead of in more conventional units such as inches or millimeters. Once the poppet is "zeroed", by overdriving the poppet it need not ever be re-zeroed, and thus battery life of the mud pulser is preserved to a degree.

The mud pulser of Pratt is but one partial solution to the problem of continually determining the position of the poppet valve, while avoiding frequently having to overdrive the poppet to determine its position with the consequent resulting degradation in battery life.

Given the importance of MWD and LWD to the oil and gas industry in being best able to control drilling of wells, providing alternate mud pulser designs is important in providing alternate competing designs for facilitating completion in the industry The foregoing background information is provided for the purpose of making known information believed by the applicant to be of possible relevance to the present invention. No admission is necessarily intended, nor should be construed, that any of the preceding information, or the reference in the drawings to "prior art" constitutes relevant prior art against the present invention.

SUMMARY OF THE INVENTION

The invention relates to a measurement-while-drilling ("MWD") servo-actuator, such as a so called "mud pulser" for use in mud-pulse telemetry, which mud pulser senses actual linear position of a poppet valve therein, without counting revolutions of a stepper motor so as to indirectly determine such linear position of such poppet valve.

The present mud pulser design of the present invention, whose configuration in various embodiments is hereinafter set out, advantageously avoids having to "overdrive" the poppet valve and thereby waste battery life, and further avoids issues with aforementioned prior art designs such as contained in U.S. Pat. No. 7,564,741 to Pratt et al. which indirectly determine poppet position by counting motor revolutions and which device requires a plurality of hall-effect sensors within a stepper motor in order to count such stepper motor revolutions.

Accordingly, in a first broad embodiment of the present invention a measurement-while-drilling servo-actuator/pulser actuator for use in mud-pulse telemetry is provided, comprising:
  (i) a sensor for sensing proximity of a poppet valve and providing an output proportional to linear proximity of said poppet valve to said sensor; and
  (ii) a controller for receiving said output from said sensor, and determining poppet valve position therefrom.

The single sensor required in this invention, as opposed to plurality of sensors required for stepper motor pole position to effectively count motor rotations in prior art designs, is, in a first embodiment of the present invention, of a type which senses a magnetic field intensity, such sensed intensity value being proportional to the position of the poppet valve relative to the sensor.

In an alternative configuration, the single required sensor is of a type which senses the inductance of an electrical winding, the sensed inductance thereof being proportional to the position of the poppet valve relative to the electrical winding.

The above pulser actuator may include a look-up table of reference sensor outputs corresponding to known linear positions of the poppet valve. Such look-up table may be used in conjunction with a sensed value received from the sensor when the poppet valve is in an unknown position to determine the precise position of the poppet valve when in said unknown position. Such determination of location may alternatively be from any one of a number of other common techniques, including but not limited to extrapolation by using a plurality of reference magnetic field intensities and corresponding known poppet positions, to determine the poppet position at said sensed value from said plurality of known sensed positions.

A particular method of determining a position of a poppet valve in a pulser actuator is further disclosed.

Specifically and more particularly in respect to the above first refinement of the present invention, such pulser actuator includes a linear position sensor therewithin which continually senses the intensity of an electromagnetic or magnetic field, the intensity of such field being proportional to the position of the poppet relative to the sensor. A magnetic field source, such as preferably a permanent magnet since no electrical current or battery power is needed to generate such magnetic field, is used. Alternatively and less desirably an electromagnet may be used to create the magnetic field. The magnetic field sensor provides an output proportional to the intensity of the magnetic field being sensed, and in particular proportional to a linear distance separating the magnetic field from the sensor, wherein one of the magnetic field or sensor is mechanically coupled and becomes linearly displaced upon movement of the poppet valve, and the other remains in a fixed position within the mud pulser. A controller, which controls the number and direction of electrical pulses provided to a stepper motor, is communicatively coupled to the magnetic field sensor. The controller compares the intensity of the magnetic field received from the sensor to a reference of expected measured magnetic field intensities at various known distances of the poppet valve between a fully open and fully closed position, such as by comparing the sensed value of the magnetic field intensity with the reference values for known poppet position, and determines the position of the poppet valve from such comparison. In such manner a precise position of the poppet relative to its fully closed position and its fully open position is thereby continually known, thereby avoiding the need to overdrive the poppet valve from time to time to re-acquire a "fix" as to its position and, thereby avoiding undesirable reduction in battery life by avoiding use of excess current and power consumption when "overdriving" the poppet in this manner.

In the above-mentioned alternative configuration/refinement, the sensor does not comprise a magnetic field sensor but instead comprises a substantially cylindrical winding of electrically conductive wires. The poppet valve, or a material directly coupled to said poppet valve, is of a ferromagnetic material. The inductance of the electrically-conductive wires changes proportional to the proximity of said ferro-magnetic poppet valve or said ferro-magnetic material to said wires. The value of the electrical inductance of the electrical wires (cylindrical winding) is used to determine relative position of the poppet valve relative to known inductances at various positions of such poppet valve between a fully open position, and a fully closed position.

Further mechanical detailed components of such pulser actuator of the present invention are set out below.

Specifically, in a first broad embodiment the measurement-while-drilling servo-actuator of the present invention comprises:
  (i) a poppet valve, linearly moveable between an open position which permits flow of drilling mud through a servo-valve port and a closed or substantially closed position wherein said poppet valve obstructs said servo-valve port to prevent or substantially prevent flow of said drilling mud therethrough;

(ii) an electric motor having an output shaft that rotates in response to operation of the motor;

(iii) a rotary-to-linear motion converter, mechanically coupled at one end to said output shaft and at another end directly or indirectly coupled to said poppet valve, for linearly moving said poppet valve back and forth between said closed position and said open position;

(iv) a sensor for sensing proximity of said poppet valve thereto and providing an output proportional to proximity of said poppet valve to said sensor; and (v) a controller for receiving said output from said sensor, and determining poppet valve position therefrom.

In the first alternative refinement, the servo-actuator comprises:

a magnetic field device within said servo-actuator, which creates a magnetic field; and said magnetic field device or said sensor is mechanically coupled to said poppet valve or situated in said poppet valve, wherein relative linear displacement of said magnetic field device relative to said sensor occurs upon linear movement of said poppet valve; and said sensor senses intensity of said magnetic field and provides an electrical output proportional to proximity of said magnetic field relative to said sensor.

In a further embodiment the aforementioned servo-actuator comprises first and second matingly engageable half-members, said first half member comprising said magnetic field device and said poppet valve; and said second half member comprising motor and said sensor.

In the further alternative configuration/refinement, the servo-actuator instead of having a magnetic field sensor comprises a sensor having a substantially cylindrical winding of electrically conductive wires whose inductance changes proportionally to the proximity of ferro-magnetic poppet valve or a ferro-magnetic material to said sensor. In such alternative configuration the poppet valve, or a material mechanically coupled to or situated on said poppet valve, is ferromagnetic so as to thereby be able to cause a change in the inductance of the cylindrical windings proportional to the proximity of the ferromagnetic poppet or ferromagnetic material thereon.

In preferred embodiments of the invention the electric motor is a brushless DC stepper motor, which type of electric motor is very well adapted, when receiving electrical step pulses, to moving the poppet valve via the rotary-to-linear converter in precise increments.

In preferred embodiments the rotary-to-linear motion converter comprises an internally threaded nut member which threadably engages and receives therein an externally-helically threaded rotatable rod coupled to said output shaft and rotated thereby, wherein the nut member is mechanically coupled to said poppet valve, and the nut member, due to rotation of said rod therein, becomes linearly displaced thereby linearly displacing said poppet valve.

In a further embodiment where the sensor is a sensor which detects intensity of a magnetic field, the nut member of the rotary-to-linear converter possesses a magnetic device, and said magnetic device such as a permanent magnet is linearly displaceable upon rotation of the rod and the magnetic field sensor is fixedly situated in said servo-actuator. The magnetic field sensor in this embodiment senses intensity of said magnetic field and provides an electrical output proportional to proximity of said nut member and thus poppet valve relative to said sensor.

In a further refinement of the invention where the sensor is alternatively a substantially cylindrical electrically conductive winding and which senses changes in inductance in the electrical winding, the nut member of the rotary-to-linear converter is of a ferromagnetic material, and the sensor senses changes in the inductance of the electrical wires and provides output to said controller proportional to proximity of said nut member to said sensor.

In another broad aspect, the pulser actuator for use with a mud pulser comprises:

(a) a motor having an output shaft that rotates in response to operation of the motor;

(b) a rotary-to-linear motion converter coupled to the output shaft;

(c) a servo valve comprising a poppet and a valve seat, wherein the poppet is coupled to the rotary-to-linear motion converter and is linearly moveable in a reciprocating manner relative to the valve seat;

(d) a magnetic field source which generates a magnetic field, and a magnetic field sensor positioned within the pulser actuator, wherein one of the magnetic field source and sensor is coupled to or part of the poppet and the other of the magnetic field source and sensor is fixed relative to the valve seat; and (e) a controller communicatively coupled to the magnetic field sensor and configured to:

(i) measure the magnetic field using the magnetic field sensor;

(ii) compare intensity of the magnetic field to a reference of expected measured magnetic field intensities at various distances between the magnetic field source and sensor; and (iii) determine the distance between the poppet and valve seat from the comparing of the intensity of the magnetic field to the reference.

In preferred embodiments, the magnetic field source is coupled to or part of the poppet and is preferably a permanent magnet, and the magnetic field sensor is fixed relative to a valve seat for the poppet valve.

In a further embodiment of the present invention, such invention comprises a method for determining location of a poppet valve within a pulser actuator, the pulser actuator comprising part of a drill string, the method comprising:

(a) locating a magnetic device on said poppet valve or on a component within said pulser actuator that is mechanically coupled to said poppet valve, and generating a magnetic field;

(b) positioning a sensor at a fixed location within said pulser actuator;

(c) creating a plurality of reference magnetic field intensities for corresponding linear positions of said poppet valve arising from positioning said poppet valve at various known positions within said pulser actuator;

(d) measuring intensity of the magnetic field using said sensor at a given unknown position of said poppet valve relative to said sensor, to create a sensed value;

(e) determining position of said poppet valve by comparing said sensed value with said reference magnetic field intensities and corresponding poppet valve position.

In a greatly preferred embodiment the magnetic device on said poppet valve or on a component mechanically coupled to said poppet valve is situated co-linear with said sensor such that said magnetic device on said poppet valve moves in the most direct manner toward, and in the most direct manner away from, said sensor. In such manner, non-linearities in sensed magnetic field which otherwise result from movement of non-co-linearly positioned magnetic device and poppet valve, wherein the two do not move on paths most directly in line with each other, are thereby reduced. In such manner non-linearities in changes in sensed magnetic field can be somewhat reduced, which is advantageous if any straight-line interpolation is to be used between adjacent reference field intensities for determining the location from a sensed magnetic field position.

In an alternative method of the present invention, such invention comprises a method for determining location of a poppet valve within a pulser actuator, said pulser actuator comprising part of a drill string, the method comprising:

(a) providing a sensor within said pulser actuator, comprising a plurality of substantially cylindrically-wound electrically conductive wire;

(b) forming a poppet valve of ferro-magnetic material, or a ferro-magnetic material mechanically coupled to said poppet valve so that said material is linearly displaced upon linear displacement of said poppet valve;

(c) creating a plurality of reference inductance values as sensed by said sensor for various correspondingly known positions of said poppet valve;

(d) sensing, via said sensor, a sensed inductance value of said cylindrically-wound electrical wire for a given position of said poppet valve; and (e) determining the location of said poppet valve by comparison of said sensed value with said reference values.

The above summary of various aspects and embodiments of the invention does not necessarily describe the entire scope of the present invention.

Other aspects, features and advantages of the invention will be apparent to those of ordinary skill in the art upon a proper review of the entire description of the invention as a whole, including the drawings and consideration of the specific embodiments of the invention described in the detailed description.

BRIEF DESCRIPTION OF THE DRAWINGS

In the accompanying drawings, which illustrate one or more exemplary and non-limiting embodiments:

FIG. 1A is an enlarged view of the encircled detail "A" in FIG. 1;

FIG. 2A is an enlarged view of the encircled detail "A" in FIG. 2;

DETAILED DESCRIPTION OF SOME OF THE PREFERRED EMBODIMENTS OF THE PRESENT INVENTION

Reference numbers referring to similar components are, for consistency, referred to by identical reference numbers throughout all of the drawings figures.

Figure 1:
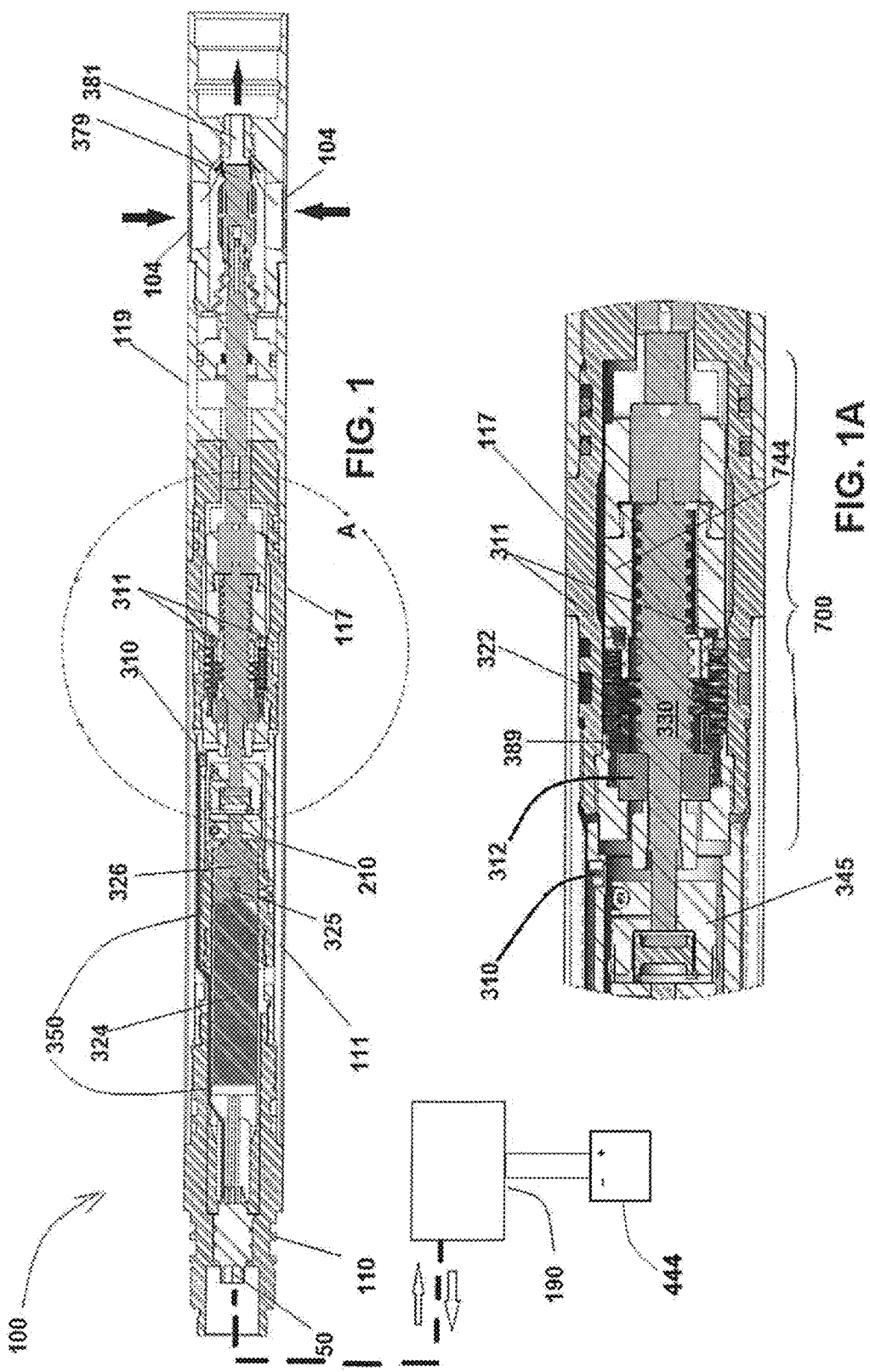
FIG. 1 is a cross-sectional view through one embodiment of the pulser actuator of the present invention having a magnetic field sensor, when said poppet valve of the servo valve is in the open position allowing flow of fluid through a servo-valve port in said mud pulser actuator.

Referring now to FIGS. 1, 1A, 2 & 2A there are shown in sectional views a pulser actuator 100 according to one embodiment of the present invention, which in the embodiment shown employs a magnetic field sensor 310 and a magnetic field device in the form of a permanent magnet 311, which magnet 311 may be an annular ring as shown, or alternatively a singular magnet positioned co-linearly with magnetic sensor 310, as best shown in FIG. 1A.

FIGS. 1 & 1A shows pulser actuator 100 and controller 190 when the controller has caused the pulser actuator to position the poppet valve 379 thereof in the open position, thereby allowing flow of fluid through a servo-valve port 381 in mud pulser actuator 100.

Figure 2:
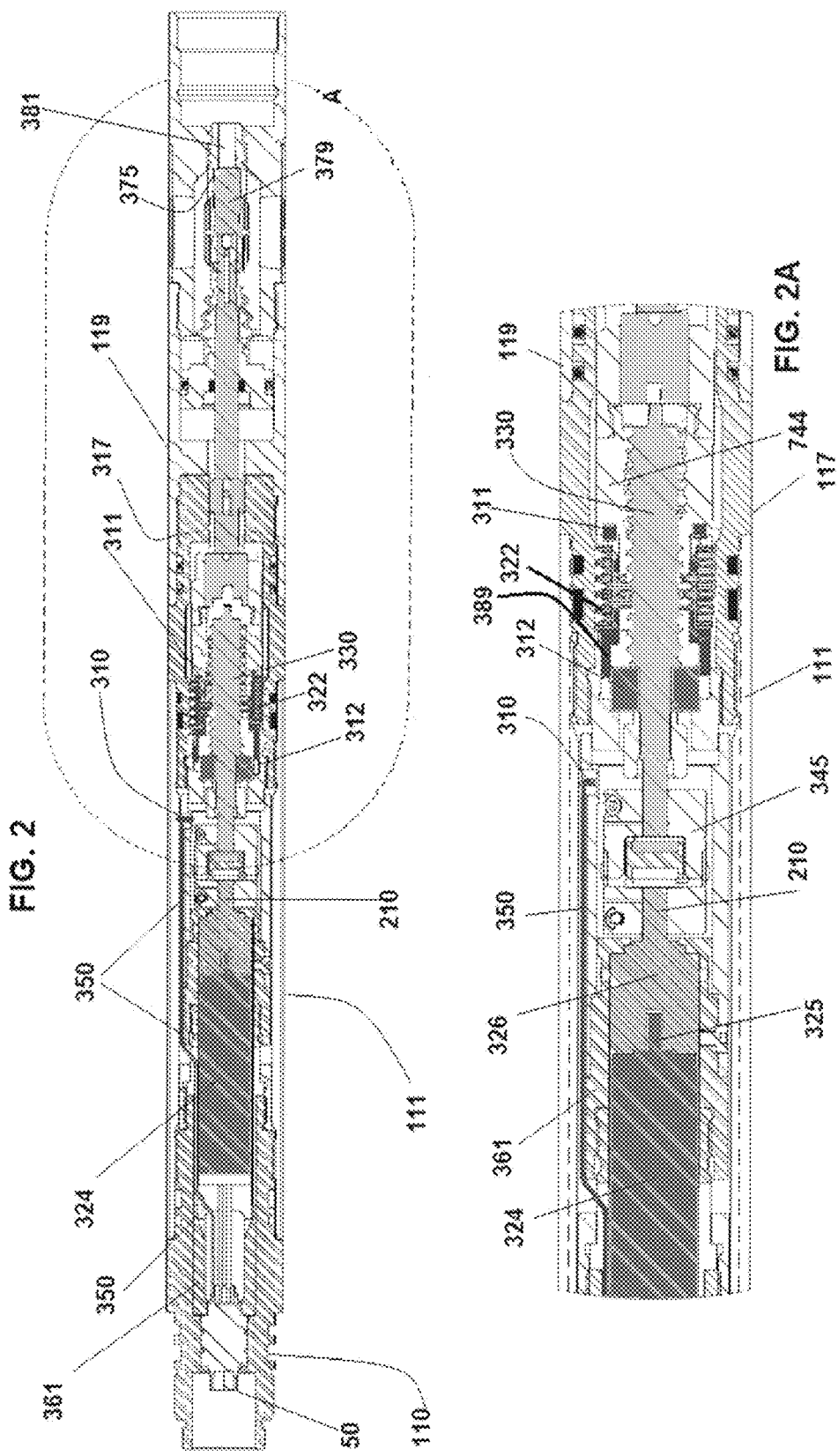
FIG. 2 is a cross-sectional view through the pulser actuator of FIG. 1, when said poppet valve of the servo valve is in the closed position preventing flow of fluid through the servo-valve port in said mud pulser actuator.

FIGS. 2 & 2A show the pulser actuator 100 of FIG. 1 when the poppet valve 379 of the servo valve (the servo valve generally shown on the right hand side of FIG. 1, and in detail in region "A" of FIG. 2, namely the region depicted in FIG. 2A) having been moved to the closed position thereby preventing flow of fluid through the servo-valve port 381.

The difference in open and closed positions of the servo-port 381 regulates opening and closing of a main (downhole) valve, which thereby causes pulses in drilling fluid pressure supplied to the drill bit. Such pulses, whose parameters are determined by the controller 190, are preferably of different duration, timing between pulses, and magnitude which are varied in a unique sequence, as determined by the controller 190, in order to encode valuable information into such pressure pulses regarding sensed downhole positions. The pressure pulses then travel through a hydrocarbon formation to surface, where they are sensed and decoded to reveal the valuable information regarding downhole drilling conditions being sent by pulser 100 via various other downhole sensors/instruments (not shown).

Pulser actuator 100 may comprise tubulars 110, 111, 117, and 119 that are each threadably coupled together (although fewer or greater numbers of tubular may be employed) to form the actuator 100 as shown in FIGS. 1 & 2. The first tubular 110 is at the top of actuator 100 and provides actuator 100 with a male preferably threaded connection for coupling actuator 100 into a portion of the drill string (not shown) above the actuator 100. The second tubular 111, screwed into the bottom of the first tubular 110, houses the components shown in FIG. 5, namely an electric motor 324 with an optional reduction gearbox 326.

Figure 3:
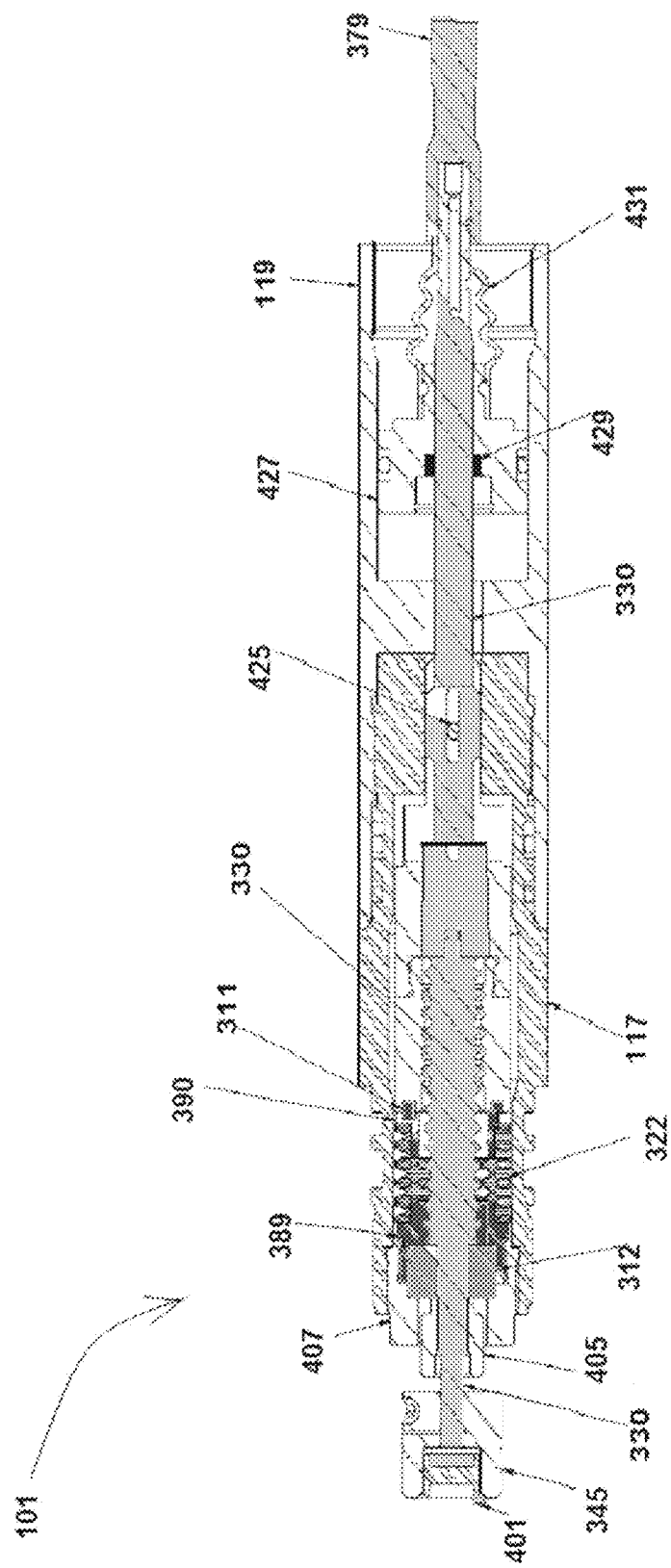
FIG. 3 shows an enlarged cross-sectional view of a first half member of the mud pulser of the present invention, in an embodiment thereof using a magnetic field sensor, such first half member possessing a permanent magnet on a nut member on the rotary-linear converter thereof.
Figure 4:
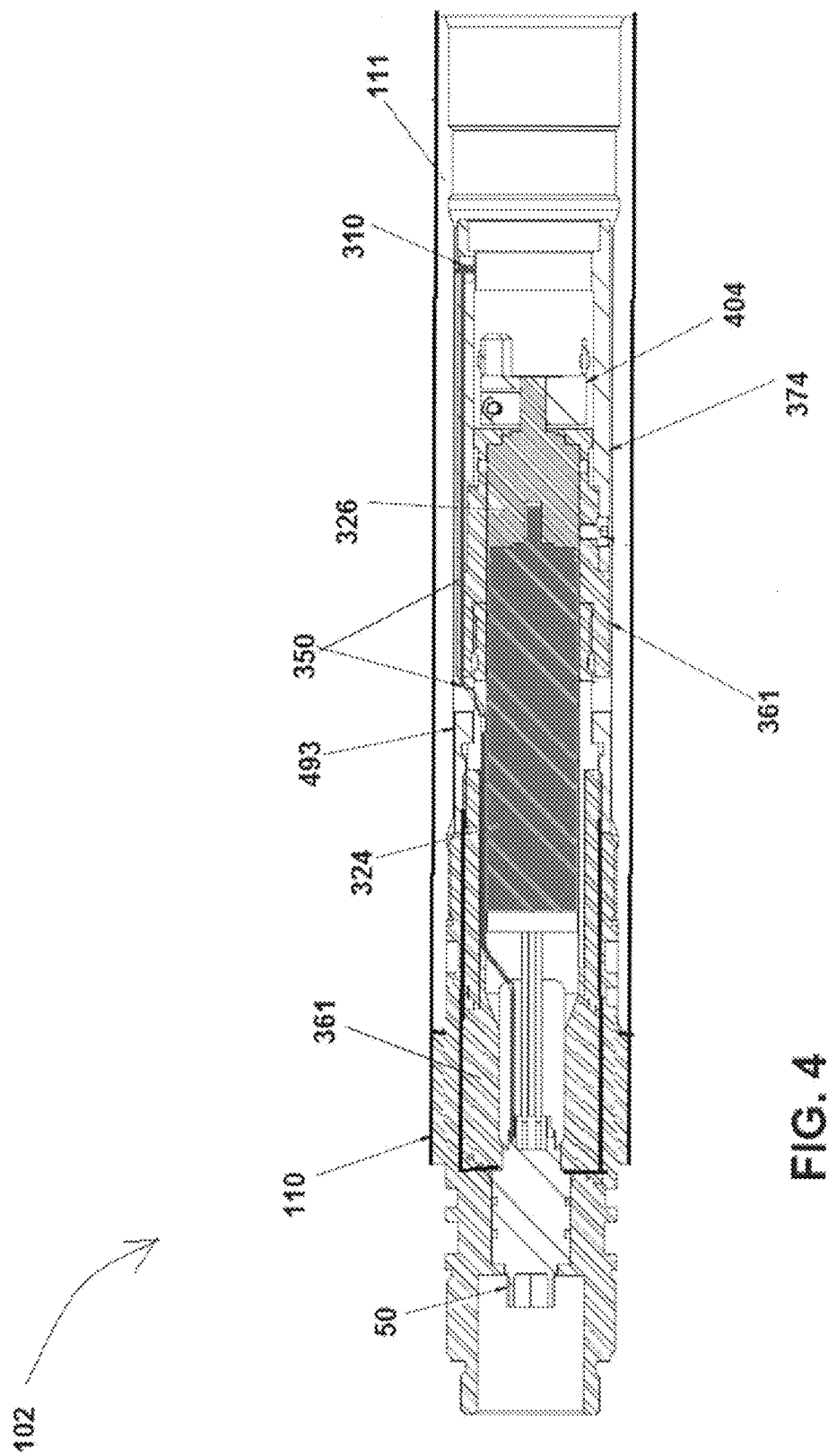
FIG. 4 shows an enlarged cross-sectional view of a second half member of the mud pulser of the present invention, in an embodiment thereof using a magnetic field sensor, such second half member containing such magnetic field sensor.

In a preferred embodiment, pulser actuator 100 may comprising a first engageable half member 101, as shown in FIG. 3, comprising tubulars 117 and 119 inter alia magnetic field device in form of permanent magnet 311 and poppet valve 379, and a second half member 102 (re. FIG. 4) matingly engageable with first half member 101, comprising tubulars 110 and 111, wherein the second half member 102 comprises a second sub assembly 105 comprising motor 50 and sensor 310, which is insertable in second half member 102. Mating engagement of first half member 101 with second half member 102 results in pulser actuator 100 of FIG. 1.

As may be seen from FIG. 3, to protect sliding surfaces within half member 101, and in particular exclude LCM from internal workings thereof, a rubber grease boot 431 is provided around a portion of poppet valve 379, and 'O' ring seals 429 further provided to assist in excluding such material. Piston 427 may further slide on shaft 331 coupled to poppet valve 379, to allow equalization of pressure downhole from that within the internal workings of the pulser actuator 100. Anti-rotation pin or collar 425 may be provided, to isolate rotation of rotating rod 330 from poppet 379. A rubber coupler 401 may be provided to connect coupler 345 and associated rotary-to-linear converter 700 with output shaft 210 on gearbox 326 contained in second half member 102.

As may be seen from FIG. 4, sub-assembly 105 containing mandrel 361, motor 324 and gearbox 326, is adapted to be co-axially situated in half-member 102, with a coupler 493 adapted to securably maintain sub-assembly 105 therein. A jaw coupling 404 may further be provided, to assist in mechanically coupling shaft 210 of gearbox 326 to rubber coupling 401 of the first half member 101.

Operation of Pulser Actuator and Controller

During typical operation, the pulser actuator 100 of the present invention forms part of a drill string (not shown) that is within a wellbore (not shown). The first tubular 110 is screwed to a segment of drill pipe (not shown) above the pulser actuator 100, which segment of drill pipe typically contains batteries or power cells and associated electronic equipment which decodes sensed data regarding downhole drilling conditions such as torque on bit, angular inclination and drill bit azimuth and the like, for supply to a controller 190. The controller 190, typically located in drill pipe above pulser-actuator 100, via electrical signals passing through an electrical connection 50 to pulser actuator/servo-actuator 100, is provided with valuable information regarding downhole drilling conditions provided by various downhole sensors/instruments (not shown). controller 190 thereafter senses position of poppet valve 379 in the manner below explained, and initiates a series of opening and closing of poppet valve (whose position it has determined relative to the fully open and/or fully closed position) to thereby transmit the required encoded pressure pulses into the hydrocarbon formation, to permit such pressure pulses to be received uphole at surface.

More particularly, drilling mud that is pumped downhole to a drill motor and drill bit from a surface rig (not shown) enters the fourth tubular 119 of pulser actuator 100 through slots 104 in the fourth tubular 119's housing as shown in FIGS. 1 & 1A, thereby allowing a high pressure flow to main mud valve (not shown). This is the so-called pulser actuator "open" position. Drilling mud that flows through the servo valve exits the pulser actuator 100 via an orifice 381 at the bottom end of the fourth tubular 119, where it is then used open or close the main mud valve as described above.

Controller 190 thereafter actuates motor 324. Motor 324 via an (optional) gearbox 325 and rotary-linear converter moves poppet valve 379 in the direction of valve seat 375. When the poppet 379 is against the valve seat 375 such that no drilling mud can pass through servo-port 381, as shown in FIG. 2, 2A, the servo-valve is in the so-called "closed" position. The poppet valve 379 may thereafter be moved back, or partially back to only thereby partially restricted valve seat/servo-port 375.

Rotary-to-Linear Converter

In the embodiment of the invention shown in FIGS. 1, 1A, 2, & 2A, 3, 4, & 5, electric motor 324 provides motive force for powering poppet valve 379 between an open position and a closed position. Electric motor 324 has an output shaft 210 that rotates in response to operation of the motor 324. Electric motor 324 is typically a brushless DC motor, which has the advantage that it is particularly suitable for precise electrical control by a controller 190. Other types of electric motors, however, may be used. Output shaft 210 of motor 324 is mechanically coupled to a rotary-to-linear converter 700 via an intermediary gearbox 326 containing reduction gearing, and coupling member 345. Specifically, gearbox 326 is provided with an output shaft which is in turn coupled to, and rotates, an externally helically threaded rod 330 of rotary-to-linear converter 700 via and coupling member 345. Alternatively, output shaft of motor 324 may be directly coupled to externally helically threaded rod 330 of rotary-to-linear converter 700 via coupling 345 without intervening gearbox 326, if electric motor speed and torque is acceptable without such gearbox 326.

As best seen from FIG. 1A, 2A, FIG. 3 and FIG. 8, rotary-to-linear converter 700 comprises an internally helically threaded nut member 389, having internal threads thereon, which in the embodiments shown is linearly moveable (but non-rotatable) laterally in a back and forth on externally helically-threaded rod 330 as a result of being situated on an externally threaded rotatable rod member 330, the latter, as noted above, being rotated by gearbox 326. Roller bearings 312, mounted in bearing race 407, are provided in rotary-to-linear converter 700 to allow rotation of helically threaded rod member 330, which is further assisted in being able to rotate by being mounted within bushing 405. Rotation of rod member 330 of rotary-linear converter 700 causes nut member 389 and intermediate mount member 744 to be laterally displaced, as shown in FIGS. 2 & 2A in comparison to FIG. 1 and FIG. 1A, and thus causes lateral movement of poppet valve 379 to abut or not abut servo-port face 375 and thus close or open, respectively, servo-port 381.

Figure 5:
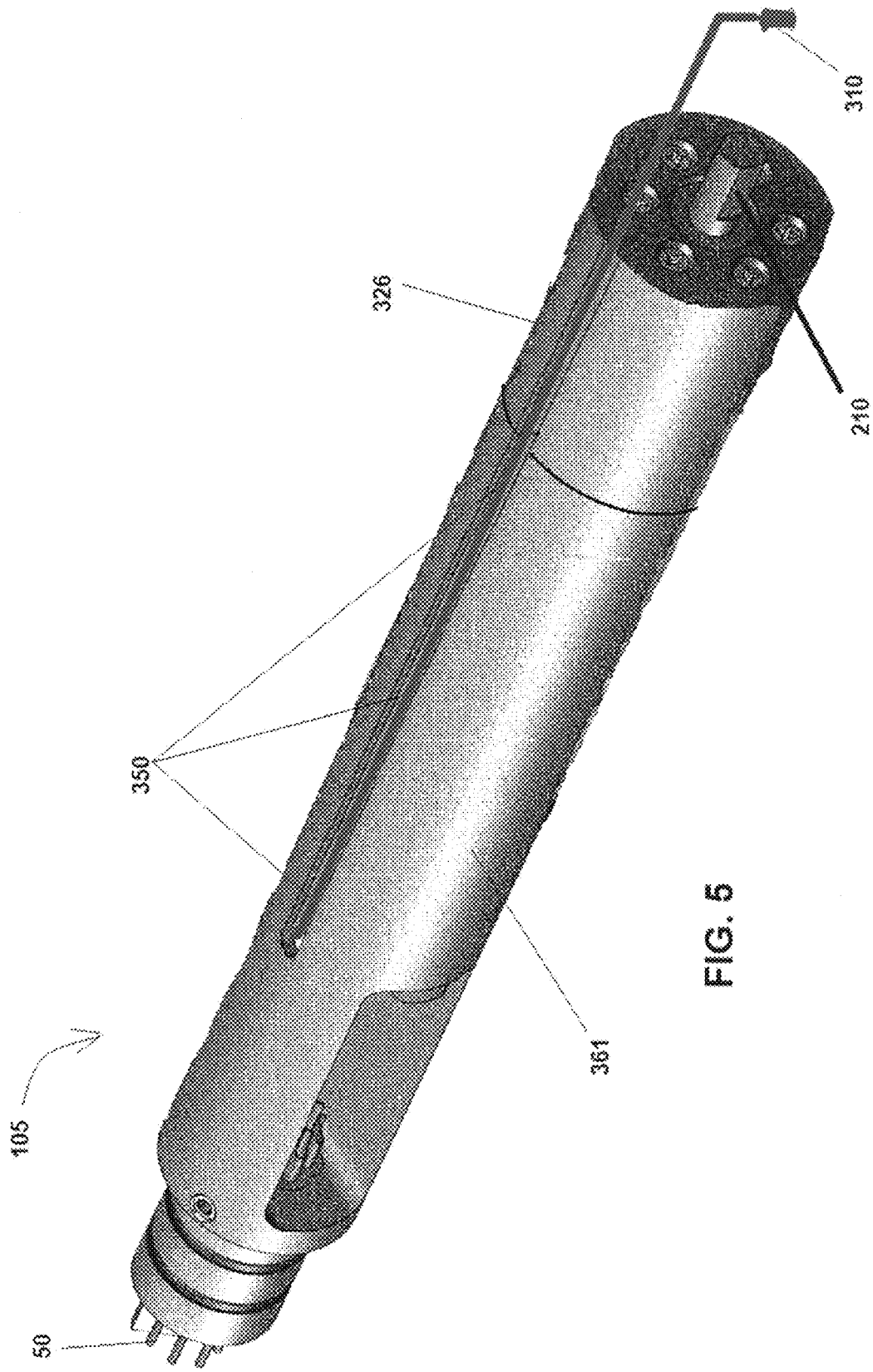
FIG. 5 shows an external, enlarged perspective view of the second half member shown in FIG. 4.

In the embodiment shown in FIGS. 1A, 2, 3, 4, & 5, at the interface between nut member 389 and intermediate mount member 744 a magnetic device in the form of a permanent magnet 311 is situated. A hall effect sensor 310 is provided within tubular 111, and an electrically conductive wire 350, provided in each of internal mandrel 361 and outer housing of gearbox 326 (ref. FIG. 5) electrically couples sensor 310 to electrical connection 50—electrical connection 50 providing further electrical communication with both controller 190 (as shown in FIG. 1) as well as a power supply in form of battery 444, as shown in FIG. 1. Controller 190 receives power from battery 444 and ceases driving poppet valve 379 past a closed position when electrical signal from sensor 310 indicates, in the manner described previously, that poppet valve 324 has reached a closed position.

Alternative Sensor and Means for Determining Poppet Position

Figure 8:
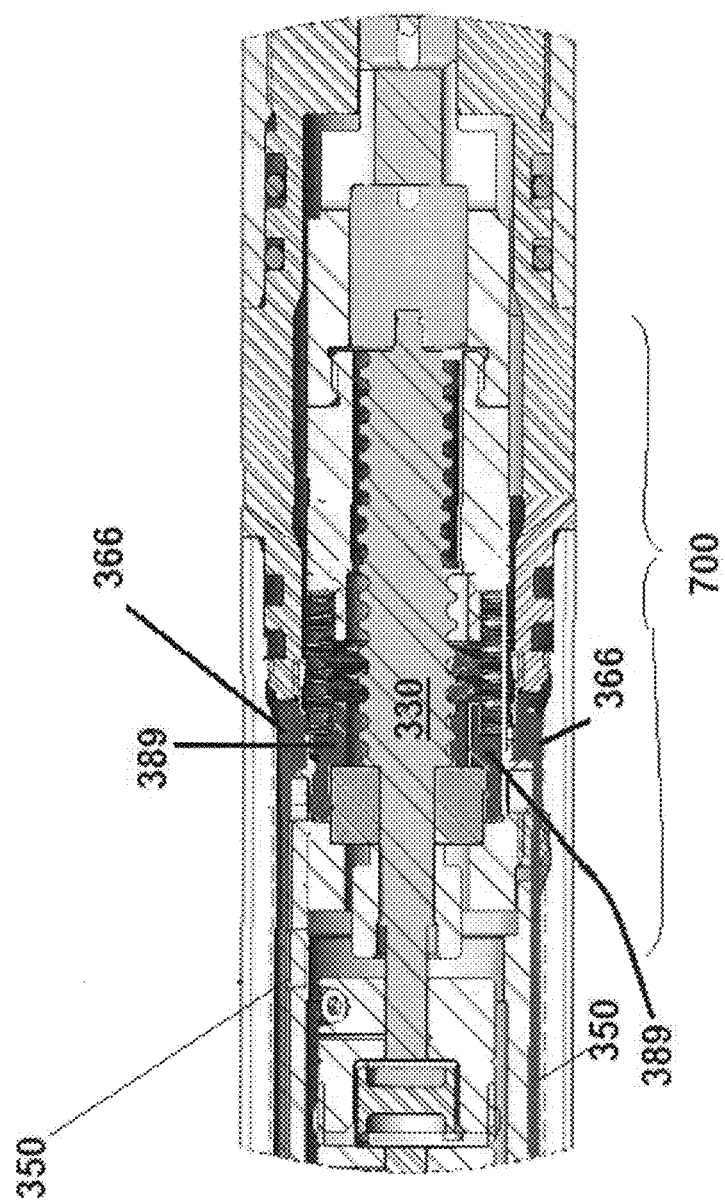
FIG. 8 shows is a cross-sectional view through a portion of another version of the pulser actuator of the present invention, wherein the sensor comprising a substantially cylindrical electrical winding, and the nut member on the rotary-linear converter is of a ferromagnetic material, wherein linear displacement of said nut member and mechanically coupled poppet valve is sensed by changes in inductance of the electrical winding.

The embodiment shown in FIG. 8 depicts another alternative configuration of the pulser actuator 100 for determining linear displacement of the poppet valve 379 and thus determining its position. In such alternative embodiment, instead of a magnet being provided as the source of a magnetic field whose position is detected by a sensor, in this embodiment helical nut member 389 is comprised of a ferro-magnetic material, or possesses a ferro-magnetic material. A sensor comprising a cylindrical winding 366 of electrically conductive wires or coils is provided which encircles or partially encircles the ferro-magnetic material, namely nut member 389. Relative movement between the electrical winding 366 (in the embodiment shown being fixedly located within tubular 117) and the ferro-magnetic material (in the embodiment shown in FIG. 8 being nut member 389 which is laterally moveable in position) causes changes in the inductance of electrical winding 366, which as a result of such electrical winding 366 being in electrical communication (via electrically conductive wires 350) with controller 190, the controller is able to determine the linear position of the poppet 379.

Figure 7:
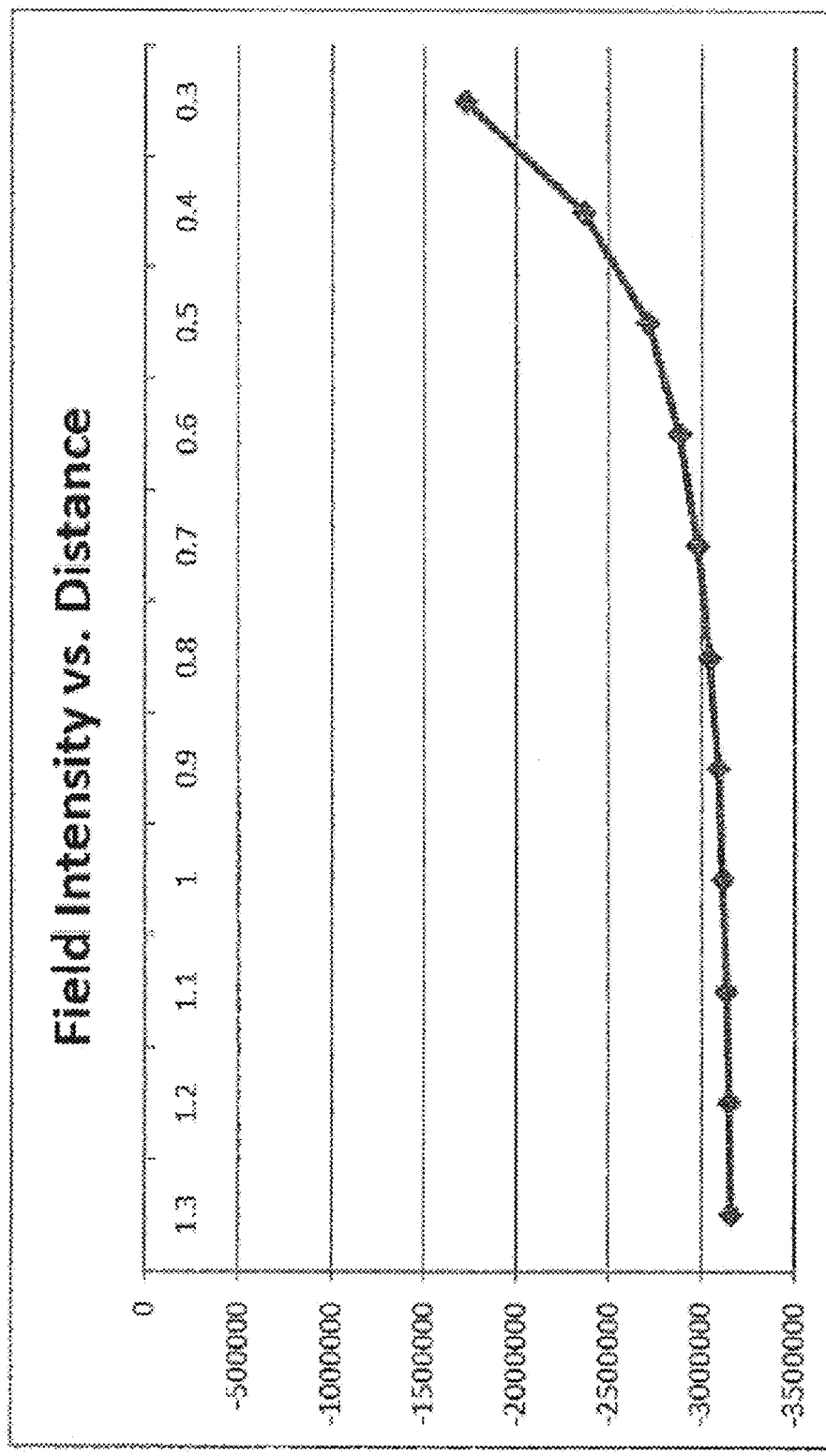
FIG. 7 shows a graph of magnetic field intensity vs. distance from the source of the magnetic field, plotted using a series of sensed reference intensities, each at corresponding known positions of said poppet valve, which data may be used as a look-up table for a controller to determine poppet position from a sensed magnetic field intensity.

In both the embodiments shown in FIG. 1, 2 and FIG. 8, controller 190 uses sensed values received from sensor 310 or 366 to establish poppet 379 position. Voltage output from a hall effect sensor 310 or the inductance of an electrical winding 366 is generally greater the closer in proximity magnet 311, or ferro-magnetic material of nut member 389, is to the sensor, and generally exhibits non-linearities in signal strength. Indeed, as seen from FIG. 7, the sensed magnitude in the case of magnetic field intensity increases exponentially the closer the magnetic field of magnet 311 approaches sensor 310. The method of using reference values, as hereinafter set out, greatly improves the accuracy in determining the position of the poppet valve, if for example a linear interpolation was used between the fully open and fully closed position, which would not provide a true position of the poppet valve due to such inherent non-linearity in magnetic field intensity, as shown in FIG. 8.

Controller and Manner of Operation Thereof

In a preferred embodiment, controller 190 is further configured to compare output received from either of sensors 310, 366 with a plurality of reference values and corresponding known locations of said poppet valve 379. Controller 190 is then able to determine position of poppet valve 379 from comparison of a received output from either of sensor 311 or 366, by correlating a sensed value with a matching of said reference values and associated known position of poppet valve 379. To accomplish these tasks, controller 190 may be provided with a microprocessor, microcontroller, programmable logic controller, field programmable gate array, or an application-specific integrated circuit, to store reference values on computer readable media, and to compare same with sensed values as sensed by either of sensors 310 or 366. Examples of computer readable media are non-transitory and semiconductor-based media suitable for use in controller 190 are flash media, random access memory, and read-only memory or EPROM chips, the latter offering the possibility of providing each controller 190 of each pulser actuator with uniquely calibrated measured reference values for each pulser actuator 100 of the present invention.

While in the depicted embodiments a single controller 190 (ref. FIG. 1) is used to perform the method of the present invention for determining poppet position and to control the motor 324, in alternative embodiments these tasks may be divided between two or more controllers 190.

Figure 6:
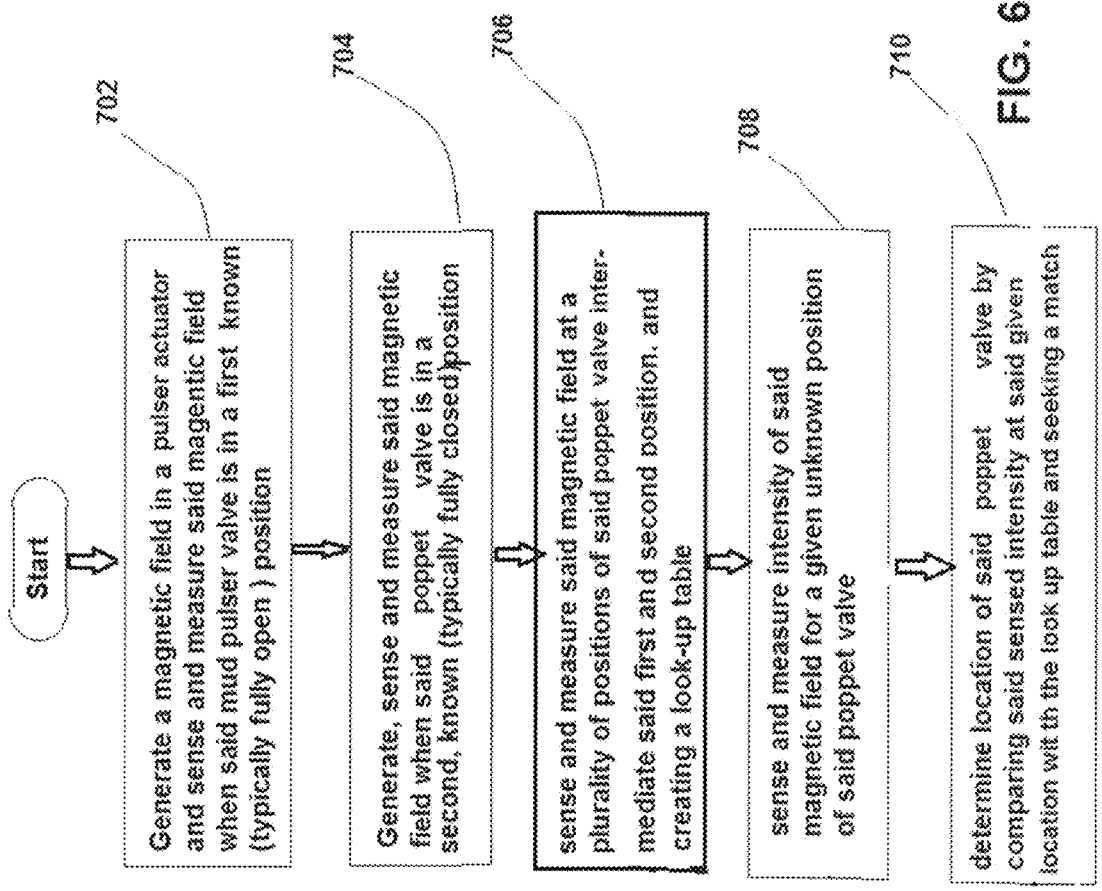
FIG. 6 shows a flowchart depicting a first broad method for determining poppet valve location, using a magnetic field sensor of the present invention.

Methods of Working the Pulser Actuator/Servo Valve of the Present Invention to Determine Poppet Location FIG. 6 shows one embodiment of a method for determining position of poppet valve 379, using a magnetic device 311 and magnetic field sensor 310.

In block 702 a magnetic field in pulser actuator 100 is generated, and the magnetic field is sensed and measured via sensor 310 when poppet valve and associated nut member 389 of rotary-linear converter 700 positions the poppet valve 379 in the closed position abutting valve face 375.

Thereafter, in block 704 a magnetic field in pulser actuator 100 is generated and the magnetic field is sensed and measured via sensor 310 when poppet valve and associated nut member 389 of rotary-linear converter 700 positions the poppet valve 379 in the open position.

In block 706, magnetic field is generated, sensed and measured via sensor 310 when poppet valve and associated nut member 389 of rotary-linear converter 700 positions the poppet valve 379 in various intermediate positions, and with the values sensed in block 702, 704 creating a reference table ("look-up" table) of sensed magnetic field intensity values at known positions of poppet 379. The order of operations in blocks 702, 704, and 706 can be interchanged.

Thereafter, in block 707, an intensity of the magnetic field is measured for a given unknown position of the poppet valve 379.

Block 710 indicates the final step to the method, wherein the look-up table residing in controller 190 is accessed, to determine position of poppet valve 379 relative to the pulser actuator 100's fully open or fully closed position.

Figure 9:
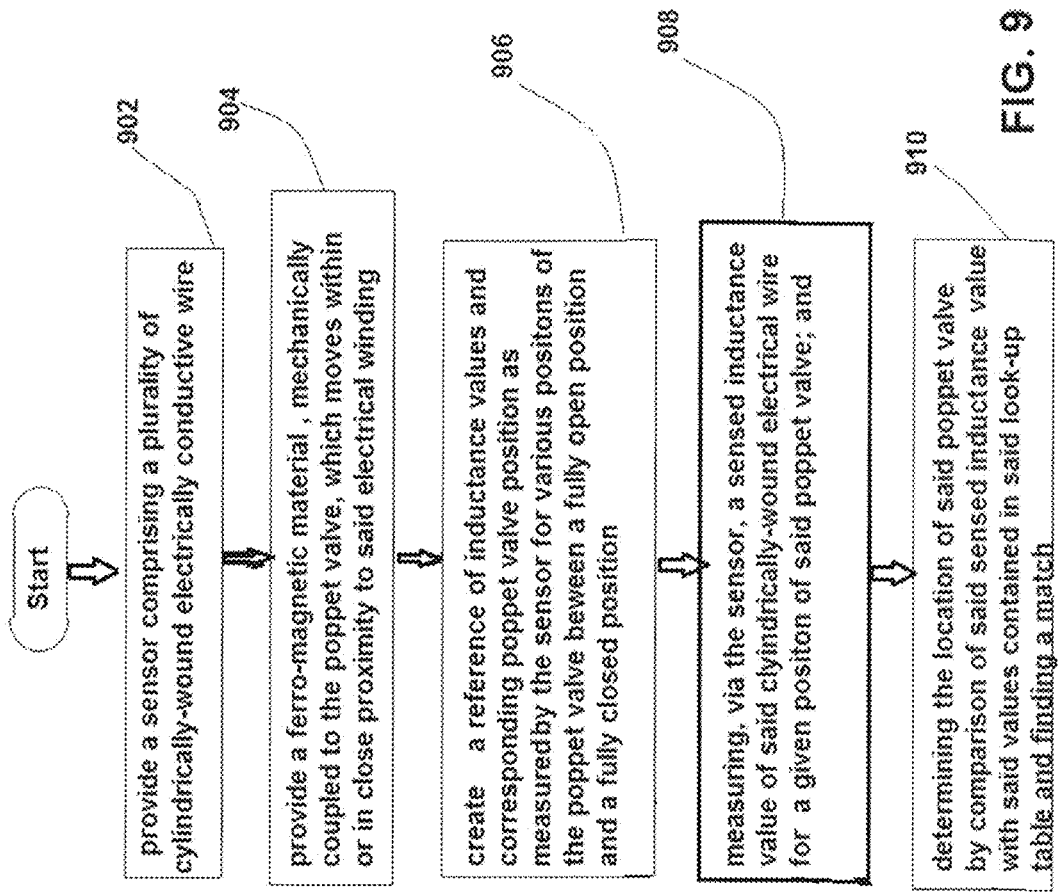
FIG. 9 shows a flowchart depicting the second alternative method for determining poppet valve location, using the configuration of mud pulser depicted in FIG. 8.

FIG. 9 shows another embodiment of a method for determining position of poppet valve 379, using a ferromagnetic material located on nut member 389, and an electrical winding 366.

In such alternative method, block/step 902 sets out the first step of providing a sensor 366 comprising a cylindrically-wound electrically conductive wire. Block 904 sets out the second step of providing a ferro-magnetic material, mechanically coupled to poppet valve 379 which moves within or in close proximity to the electrical winding 366. Block/step 906 comprises creating a reference of inductance values and corresponding poppet valve 379 position, as measured by electrical windings comprising sensor 366, for various positions of poppet valve 370 between fully open and fully closed position.

Subsequent block/step 908 comprises measuring, via sensor 366, a sensed inductance value of the cylindrically-wound electrical wire for a given position of poppet valve 379.

Finally, block/step 910 comprises determining (at a later time when poppet valve 379 position is initially unknown) the location of the poppet valve 379 by comparison of the sensed inductance value at such (unknown) location with the reference values, typically contained in a look-up table, and selecting a match.

It is contemplated that any part of any aspect or embodiment discussed in this specification can be implemented or combined with any part of any other aspect or embodiment discussed in this specification.

Directional terms such as "top," "bottom," "upwards," "downwards," "vertically," and "laterally" used in the above description are for the purpose of providing relative reference only, and are not intended to suggest any limitations on how any article is to be positioned during use, or to be mounted in an assembly or relative to an environment.

Use of examples in the specification, including examples of terms, is for illustrative purposes only and is not intended to limit the scope and meaning of the embodiments of the invention set out and described in the disclosure. In the specification, the word "comprising" is used as an open-ended term, substantially equivalent to the phrase "including, but not limited to," and the word "comprises" has a corresponding meaning.

The scope of the claims should not be limited by the preferred embodiments set forth in the foregoing examples, but should be given the broadest interpretation consistent with the description as a whole, and the claims are not to be limited to the preferred or exemplified embodiments of the invention.

The invention claimed is:

1. A measurement-while-drilling servo-actuator for use in mud-pulse telemetry downhole below earth's surface, which reduces or eliminates overdriving of a valve therein and thereby avoids wastage of battery life: comprising:
   (i) a poppet valve, linearly moveable between an open position which permits flow of pressurized drilling mud through a servo-valve port and a closed or substantially closed position wherein said poppet valve obstructs said servo-valve port to prevent or substantially prevent flow of said pressurized drilling mud therethrough;
   (ii) an electric motor having at one end thereof an output shaft that rotates in response to operation of the electric motor;
   (iii) a battery, electrically coupled to said electric motor to provide electrical current when desired to said electric motor to cause said electric motor to turn in a first direction or in a second opposite direction; (iv) a rotary-to-linear motion converter mechanically coupled at one end thereof to said poppet valve, for linearly moving said poppet valve back and forth between said closed position and said open position; (v) a sensor for sensing proximity of said poppet valve to said sensor and providing an output proportional to proximity of said poppet valve to said sensor; and
   (vi) a controller for receiving data as to downhole conditions to and controlling the electric motor to open and close the poppet valve-for varying times and durations to thereby cause flow of said pressurized drilling mud therethrough to vary in a coded sequence so as to thereby transmit said data as to said downhole conditions in said coded sequence uphole to said earth's surface via resulting-pressure pulses in said pressurized drilling mud, said controller in electrical communication with said sensor and further configured for receiving said output from said sensor and determining poppet valve position therefrom,
   wherein if said poppet valve is determined by said controller as a result of said output received from said sensor to have reached said closed position when said electric motor is turning in said first direction, said controller is configured to ceases allowing said battery to provide said current to said electric motor to turn said electric motor in said first direction and thereby stops forcing said poppet valve into said closed position and thus prevents unneeded consumption of said electrical current from said battery.

2. The servo-actuator as claimed in claim 1, further comprising:
   a magnetic field device within said servo-actuator, which creates a magnetic field; and
   said magnetic field device or said sensor is mechanically coupled to said poppet valve or situated in said poppet valve wherein relative linear displacement of said magnetic field device relative to said sensor occurs upon linear movement of said poppet valve; and
   said sensor senses intensity of said magnetic field and provides an electrical output proportional to proximity of said magnetic field relative to said sensor.

3. The servo-actuator as claimed in claim 1, wherein:
   said poppet valve, or a material directly coupled to said poppet valve, is of a ferromagnetic material; and
   said sensor comprises a cylindrical winding of electrical wires whose inductance changes proportional to proximity of said ferro-magnetic poppet valve or said material to said sensor.

4. The servo-actuator as claimed in claim 1, wherein said controller is further configured to compare said output received from said sensor with a plurality of reference values and corresponding known locations of said poppet valve, and determines position of said poppet valve from comparison of said output with said plurality of reference values.

5. The servo-actuator as claimed in claim 2, wherein the sensor comprises a single Hall-effect sensor which senses changes in said magnetic field.

6. The servo-actuator as claimed in claim 2, wherein the sensor is fixedly located in said servo-actuator, and said magnetic field device is incorporated into, or mechanically coupled to, directly or indirectly, said linearly moveable poppet valve.

7. The servo-actuator as claimed in claim 2, comprising first and second matingly engageable half-members,
   said first half member comprising said magnetic field device and said poppet valve; and
   said second half member comprising said electric motor and said sensor.

8. The servo-actuator as claimed in claim 1, wherein said electric motor is a brushless electric stepper motor.

9. The servo-actuator as claimed in claim 2, wherein said magnetic field device is a permanent magnet.

10. The servo-actuator as claimed in claim 1, wherein:
    the rotary-to-linear motion converter comprises an internally threaded nut member which threadably engages and receives therein an externally-threaded, rotatable helical rod coupled to said output shaft and rotated thereby;
    said nut member mechanically coupled to said poppet valve; and
    said nut member due to rotation of said helical rod therein becomes linearly displaced thereby linearly displacing said poppet valve.

11. The servo-actuator as claimed in claim 10, wherein:
    said nut member possesses a magnet, and said magnet is linearly displaceable upon rotation of said helical rod;
    said sensor is fixedly situated in said servo-actuator, and
    said sensor senses intensity of said magnetic field and provides an electrical output proportional to proximity of said nut member relative to said sensor.

12. The servo-actuator as claimed in claim 10, wherein:
    said nut member is of a ferromagnetic material; and
    said sensor comprises a cylindrical winding of electrical wires whose inductance changes proportional to proximity of said nut member to said sensor; and said sensor senses changes in inductance proportional to proximity of said nut member to said electrical winding, and provides said output to said controller proportional to proximity of said nut member to said sensor.

13. A pulser actuator for use with a mud pulser downhole below earth's surface and proximate a distal end of a drill string, which pulser actuator reduces or eliminates overdriving of a valve therein and thereby avoids wastage of battery life, the pulser actuator comprising:
  (a) an electric motor having an output shaft at one end thereof that rotates in response to operation of the electric motor;
  (b) a battery, electrically coupled to said electric motor to provide electrical current when desired to said electric motor to cause said electric motor to turn in a first direction or in a second opposite direction;
  (c) a rotary-to-linear motion converter, comprising a rotating exteriorly-threaded rod member which is coupled to the output shaft at one end thereof and which rod member when rotated linearly displaces therealong an internally-threaded member;
  (d) a servo valve comprising a poppet valve and a valve seat for the poppet valve, configured to regulate passage of pressurized drilling mud therethrough; wherein the poppet valve is coupled to the rotary-to-linear motion converter and is linearly moveable in a reciprocating manner relative to said valve seat,
  (e) a magnetic field source which generates a magnetic field,
  (f) a magnetic field sensor positioned within the pulser actuator, wherein one of the magnetic field source and magnetic field sensor is coupled to or part of the poppet valve and the other of the magnetic field source and magnetic field sensor is fixed in position within said pulser actuator;
  (g) a controller, for receiving data as to downhole conditions and to control the electric motor to open and close the poppet valve for varying times and durations in a coded sequence to thereby transmit said data in said coded sequence uphole to said earth's surface via pressure pulses in said pressurized drilling mud, said controller in electrical communication with and for receiving an output from said magnetic field sensor for determining position of said poppet valve, said controller further configured to:
    receive an output indicating an intensity of a magnetic field from the magnetic field sensor positioned as aforesaid within said pulser actuator;
    (ii) compare said measured intensity of the magnetic field to a reference of measured magnetic field intensities at various distances between the magnetic field source and magnetic field sensor;
    (iii) determine the distance between the poppet valve and valve seat by comparing said measured intensity of the magnetic field to said reference of measured magnetic field intensities at said various distances; and
    (iv) if said poppet valve is determined by said controller as a result of said output received from the magnetic field sensor to have reached a closed position which obstructs passage of said pressurized drilling mud when said electric motor is turning in said first direction, the controller is configured to cease allowing said battery to provide said electrical current to said electric motor to turn said electric motor in said first direction and thereby refrain from continuing to force said poppet valve into said closed position to thereby prevent unneeded consumption of said electrical current from said battery.

14. The pulser actuator of claim 13 wherein the magnetic field source is coupled to or part of the poppet and the magnetic field sensor is fixed relative to the valve seat.

15. The pulser actuator of claim 14, wherein:
  the rotary-to-linear motion converter comprises an internally threaded nut member which threadably engages and receives therein an externally helically threaded rod;
  said nut member mechanically coupled to said poppet valve, wherein said output shaft of said motor rotates said threaded rod; and
  said nut member due to rotation of said helical rod therein becomes linearly displaced thereby linearly displacing said poppet valve.

* * * * *